(12) United States Patent
Kume et al.

(10) Patent No.: US 9,778,970 B2
(45) Date of Patent: Oct. 3, 2017

(54) MEMORY CHECK, ABNORMALITY THRESHOLD COUNT, AND RESET IN AN ONBOARD ELECTRONIC CONTROL UNIT

(71) Applicant: DENSO CORPORATION, Kariya, Aichi-pref. (JP)

(72) Inventors: Masato Kume, Nagoya (JP); Yasushi Kanda, Kariya (JP)

(73) Assignee: DENSO CORPORATION, Kariya, Aichi-pref (JP)

(*) Notice: Subject to any disclaimer, the term of this patent is extended or adjusted under 35 U.S.C. 154(b) by 156 days.

(21) Appl. No.: 14/651,195

(22) PCT Filed: Nov. 5, 2013

(86) PCT No.: PCT/JP2013/006515
§ 371 (c)(1),
(2) Date: Jun. 10, 2015

(87) PCT Pub. No.: WO2014/091666
PCT Pub. Date: Jun. 19, 2014

(65) Prior Publication Data
US 2015/0317198 A1 Nov. 5, 2015

(30) Foreign Application Priority Data
Dec. 12, 2012 (JP) ................. 2012-271464

(51) Int. Cl.
*G06F 11/07* (2006.01)
*G06F 11/14* (2006.01)
*G06F 12/16* (2006.01)

(52) U.S. Cl.
CPC ........ *G06F 11/0739* (2013.01); *G06F 11/073* (2013.01); *G06F 11/076* (2013.01);
(Continued)

(58) Field of Classification Search
CPC .............. G06F 11/0793; G06F 11/073; G06F 11/0739; G06F 11/076; G06F 11/0784;
(Continued)

(56) References Cited

U.S. PATENT DOCUMENTS 6,505,305 B1 * 1/2003 Olarig .................... G11C 29/76
714/5.11
6,611,931 B1 * 8/2003 Sumida .................. G11C 29/08
714/718

(Continued)

FOREIGN PATENT DOCUMENTS

JP H05096976 A 4/1993
JP H11039231 A 2/1999
(Continued)

OTHER PUBLICATIONS

International Search Report and Written Opinion (in Japanese with English Translation) for PCT/JP2013/006515, mailed Jan. 21, 2014; ISA/JP.

*Primary Examiner* — Gabriel Chu
*Assistant Examiner* — Paul Contino
(74) *Attorney, Agent, or Firm* — Harness, Dickey & Pierce, P.L.C.

(57) ABSTRACT

Provided is an onboard electronic control unit. A CPU regularly performs a memory check and, if a determination has been made that there is an error in the memory content, writes the number of times an error has been determined to an error count storage unit, and resets itself. Immediately after the CPU has been reset and before the first memory check is performed, an error determination unit determines whether or not the error count stored in the error count storage unit is at least an error determination threshold. If the error count is at least the error determination threshold, an
(Continued)

error response unit causes the CPU to execute a specific error response program, out of the programs in the memory.

5 Claims, 7 Drawing Sheets

(52) U.S. Cl.
CPC ........ *G06F 11/079* (2013.01); *G06F 11/0784* (2013.01); *G06F 11/0787* (2013.01); *G06F 11/0793* (2013.01); *G06F 11/14* (2013.01); *G06F 12/16* (2013.01); *G06F 11/1433* (2013.01)

(58) Field of Classification Search
CPC .... G06F 11/0787; G06F 11/079; G06F 11/14; G06F 12/16; G06F 11/1433
See application file for complete search history.

(56) References Cited

U.S. PATENT DOCUMENTS

| | | | | |
|---|---|---|---|---|
| 7,523,346 | B2* | 4/2009 | Barlow | G06F 11/0775 714/42 |
| 7,890,227 | B2* | 2/2011 | Sayama | H02J 9/061 701/1 |
| 8,509,989 | B2* | 8/2013 | Jacobi | F02D 41/22 701/34.4 |
| 2003/0060964 | A1* | 3/2003 | Ozeki | F02D 41/22 701/114 |
| 2006/0047374 | A1* | 3/2006 | Hashimoto | G06F 1/30 701/1 |
| 2006/0062046 | A1* | 3/2006 | Babudri | G06F 11/1417 365/185.09 |
| 2006/0224808 | A1* | 10/2006 | Depew | G06F 13/24 710/267 |
| 2006/0248312 | A1* | 11/2006 | Barlow | G06F 11/1415 712/35 |
| 2006/0259207 | A1* | 11/2006 | Natsume | G06F 8/65 701/1 |
| 2007/0198874 | A1* | 8/2007 | Watanabe | G06F 11/0739 714/49 |
| 2008/0010511 | A1* | 1/2008 | Higashi | G06F 11/0793 714/10 |
| 2009/0037780 | A1* | 2/2009 | Nakagaki | G06F 11/0739 714/48 |
| 2010/0145611 | A1* | 6/2010 | Tokue | B60R 11/0235 701/532 |
| 2010/0251019 | A1* | 9/2010 | Yoshida | G06F 11/1008 714/15 |
| 2010/0313084 | A1* | 12/2010 | Hida | G06F 11/1068 714/704 |
| 2010/0313192 | A1 | 12/2010 | Natsume | |
| 2011/0116325 | A1* | 5/2011 | Lee | G06F 11/073 365/189.05 |
| 2014/0068590 | A1 | 3/2014 | Natsume | |

FOREIGN PATENT DOCUMENTS

| | | |
|---|---|---|
| JP | 4577075 B2 | 11/2010 |
| JP | 2011081617 A | 4/2011 |
| WO | WO-2009078145 A1 | 6/2009 |

* cited by examiner

US 9,778,970 B2

MEMORY CHECK, ABNORMALITY THRESHOLD COUNT, AND RESET IN AN ONBOARD ELECTRONIC CONTROL UNIT

CROSS-REFERENCE TO RELATED APPLICATIONS

This application is a U.S. National Phase Application under 35 U.S.C. 371 of International Application No. PCT/JP2013/006515 filed on Nov. 5, 2013 and published in Japanese as WO 2014/091666 A1 on Jun. 19, 2014. This application is based on and claims the benefit of priority from Japanese Patent Application No. 2012-271464 filed Dec. 12, 2012. The entire disclosures of all of the above applications are incorporated herein by reference.

TECHNICAL FIELD

The present disclosure relates to an onboard electronic control unit.

BACKGROUND ART

The onboard electronic control unit (hereinafter referred to as "ECU") mounted in a vehicle includes a microcomputer having a memory in which diverse programs are stored, and a CPU. The onboard electronic control unit controls the respective parts of a vehicle with the execution of the diverse programs by the CPU. The memory is generally formed of a nonvolatile memory such as a flash memory or an EEPROM so as to allow the rewriting of the programs (hereinafter referred to as "reprogramming"). The reprogramming of the memory is generally performed in such a manner that the CPU executes a reprogramming program (hereinafter referred to as "reprogramming software"). The reprogramming program is stored as one of the diverse programs (for example, refer to PTL 1).

In reprogramming the memory, the reprogramming may fail due to diverse factors such as abnormal power-off of the ECU or an abnormal programming process. Assuming a failure of such reprogramming, PTL 1 discloses the following technique. The reprogramming software is configured to set an identification ID indicating that reprogramming is being executed during reprogramming, and if reprogramming has been normally completed, set an identification ID indicating this fact. The CPU first checks the identification ID at startup, and if the identification ID indicating that reprogramming has been normally completed is set, the CPU shifts to the execution of a normal control program (hereinafter referred to as "ECU software"). If the identification ID indicating that reprogramming is being executed remains set, the CPU again starts the reprogramming software, and waits for another reprogramming operation.

In more detail, the above technique can be realized by the following configuration. A storage area for the identification ID other than that for the reprogramming software is disposed in the memory, and a startup determination processing program is stored in the memory, and an address of the startup determination processing program is set in a reset vector. After reset, the CPU first acquires the address set in the reset vector, and executes the program (that is, startup determination processing program) of that address. The startup determination processing determines whether the identification ID indicates that reprogramming is being executed, or that reprogramming has been completed. The startup determination processing starts up normal ECU software when the identification ID indicates that reprogramming has been completed, and starts up the reprogramming software when the identification ID indicates that reprogramming is being executed.

With the above technique, even if reprogramming fails and the program in the memory becomes in an abnormal state, the startup determination processing executed in subsequent resetting determines whether the reprogramming has been successfully performed or not. If reprogramming is not normally completed, the CPU can again transition to the reprogramming waiting.

The abnormal program in the memory may occur due to diverse factors such as data corruption caused by noise or hardware failure in addition to the above-mentioned case in which the abnormal program occurs due to the failure of reprogramming. Even if reprogramming is normally completed, the program in the memory may be in the abnormal state due to a subsequent use state of the ECU or environment (particularly, electromagnetic environment).

Under the circumstance, a microcomputer of a typical ECU is configured to perform memory check (for example, ROM checksum) using software immediately after startup (after confirming the normal completion of reprogramming), and to perform the memory check periodically during the execution of the ECU software, and to perform reset of the microcomputer if it is determined that the memory is abnormal. In other words, the microcomputer is configured so as to appropriately cope with the abnormal program occurring during normal use in addition to the handling of a failure to reprogram.

PRIOR ART LITERATURE

Patent Literature

PTL 1: Japanese Patent No. 4577075

SUMMARY OF INVENTION

However, according to the present inventors' study on the microcomputer configured to check the memory periodically as described above, once the program in the memory becomes abnormal, the program is determined to be abnormal by memory check, and reset, and the program is again determined to be abnormal by memory check immediately after reset, and again reset. Thus, the persistent repetition of reset occurs.

When reset is repeated due to the abnormal program as described above, an electric power is wastefully consumed as much. In particular, in the recent ECU, the microcomputer continues performing an operation (in typical, intermittent operation) even while an engine of a vehicle stops, and continues consuming an electric power of a vehicle battery. For that reason, when the abnormal program occurs during the engine stop, not only the ECU software is not normally executed, but also the electric power of the battery steadily decreases by the repetition of reset, resulting in the possibility that the battery runs out.

The present disclosure has been made in view of the above problem and has an object to provide a technology that concerns an onboard electronic control unit configured to reset a CPU (microcomputer) when a program abnormality is determined by memory check and that enables the onboard electronic control unit to perform appropriate processing while suppressing the wasteful consumption of an electric power even if the program abnormality occurs.

An onboard electronic control unit according to an example of the present disclosure includes a memory, a CPU, an abnormality frequency storage unit, an abnormality frequency update unit, an abnormality determination unit, and an abnormality handling unit.

The nonvolatile memory stores a plurality of programs including a control program for controlling a vehicle. The CPU executes the plurality of programs and periodically performs memory check of whether or not a storage content in the memory is normal. The CPU executes a reset of the CPU itself when it is determined by the memory check that the storage content in the memory is abnormal. The abnormality frequency storage unit stores the number of abnormalities defined as the number of times it is determined by the memory check that the storage content in the memory is abnormal. Every time it is determined by the memory check that the storage content in the memory is abnormal, the abnormality frequency update unit updates the number of abnormalities stored in the abnormality frequency storage unit before the reset of the CPU is executed. The abnormality determination unit determines whether or not the number of abnormalities stored in the abnormality frequency storage unit is equal to or larger than a predetermined abnormality determination threshold, before the memory check is performed for the first time since the reset of the CPU. The abnormality handling unit allows the CPU to execute a specific error handling processing program among the plurality of programs when the abnormality determination unit determines that the number of abnormalities is equal to or larger than the abnormality determination threshold. During executing the error handling processing program, the CPU is prohibited from executing the memory check or from executing the reset of the CPU based on the memory check.

According to the onboard electronic control unit configured as described above, every time it is determined by the memory check that the program is abnormal, the number of abnormalities is stored (updated) before the CPU is reset every time it is determined by the memory check that the program is abnormal. After the CPU is reset, the CPU executes the error handling processing program when the number of abnormality is equal to or larger than the abnormality determination threshold. Reset by the memory check is not performed during executing the error handling processing program. For that reason, even if abnormality occurs in the storage content in the memory, appropriate processing can be performed while the wasteful consumption of the electric power is suppressed.

In the above onboard electronic control unit, the abnormality frequency storage unit, the abnormality determination unit, and the abnormality handling unit can be provided as hardware other than the memory and the CPU. Because those respective components are provided by the hardware different the memory and the CPU, update of the number of abnormalities by the memory check and the execution of the error handling processing program based on the number of abnormalities are realized rapidly with high reliability without depending on a state of the memory.

BRIEF DESCRIPTION OF DRAWINGS

The above-described and other objects, features, and advantages of the present disclosure will become more apparent from the below detailed description made with reference to the accompanying figures. In the drawings.

DESCRIPTION OF EMBODIMENTS

Hereinafter, embodiments of the present disclosure will be described with reference to the accompanying drawings. The embodiments of the present disclosure are not limited by the following embodiments. Modes in which parts of the configuration of the following embodiments are omitted are also included in the embodiments of the present disclosure, and modes in which the following multiple embodiments are appropriately combined together are also included in the embodiments of the present disclosure.

Figure 1:
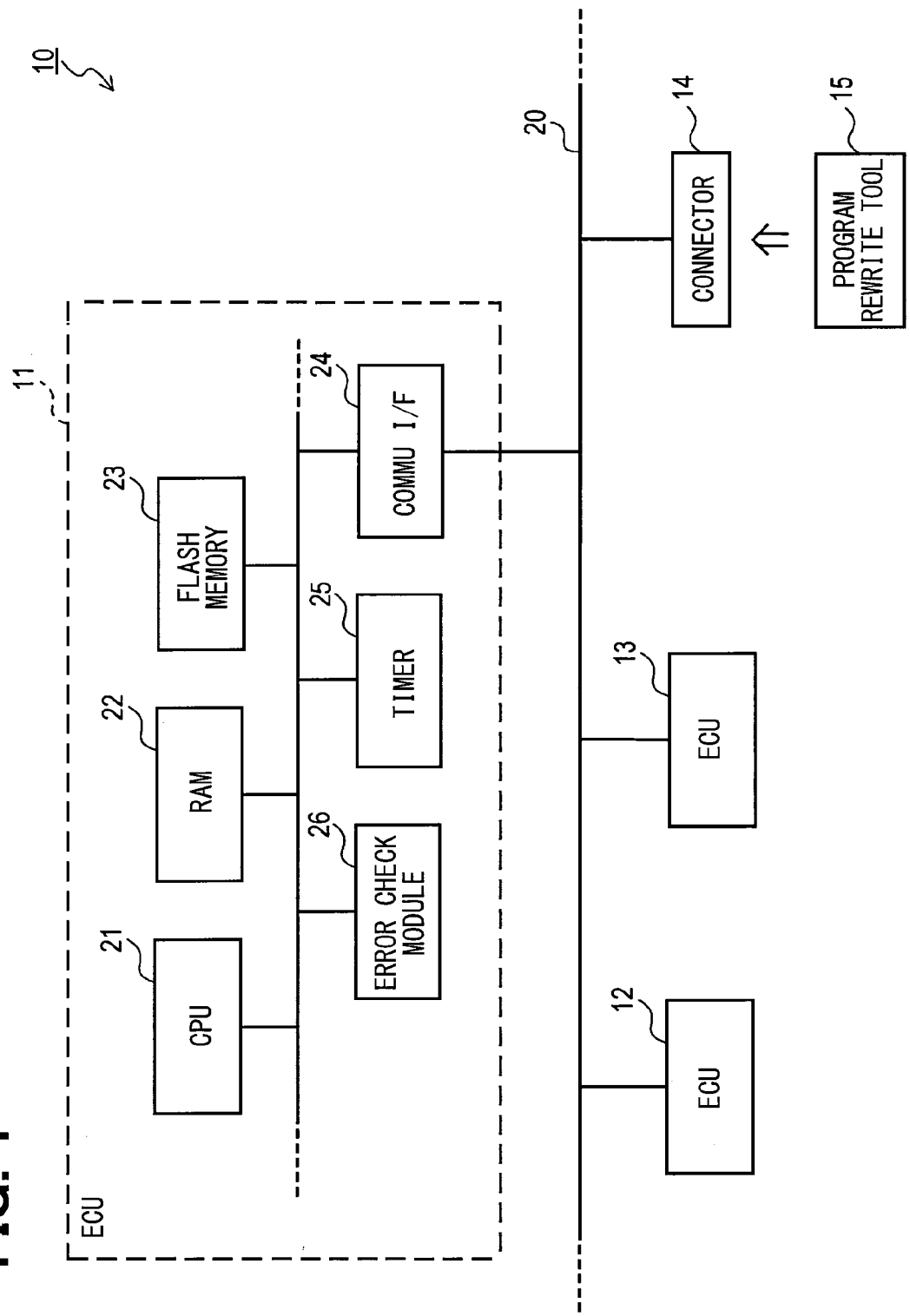
FIG. 1 is a block diagram illustrating a schematic configuration of a vehicle control system according to an embodiment.

(First Embodiment)
(1) Schematic Configuration of Overall Vehicle Control System A vehicle control system 10 according to this embodiment illustrated in FIG. 1 is a system that is mounted in a vehicle for controlling respective parts of the vehicle. The vehicle control system 10 is configured so that multiple ECUs 11, 12, 13 . . . can communicate data with each other through an onboard network (for example, CAN) 20. The respective ECUs 11, 12, and 13 are diverse ECUs such as an engine ECU, a body ECU, and a navigation ECU.

The onboard network 20 is connected with a connector 14 for connection of a program rewriting tool 15. With the connection of the program rewriting tool 15 to the connector 14, reprogramming by the program rewriting tool 15 can be performed as will be described later.

Each of the ECUs 11, 12, and 13 includes a microcomputer, and the microcomputer executes diverse control processes to realize the control of the respective parts of the vehicle. Among those ECUs, particularly, at least one ECU 11 has a characteristic configuration including an error determination module 26 (to be described later in detail). Therefore, in the following description, the configuration and functions of the ECU 11 will be described in detail.

The ECU 11 includes a CPU 21, a RAM 22, a flash memory 23, a communication interface (communication I/F) 24, a timer 25, and the error determination module 26. The CPU 21, the RAM 22, the flash memory 23, the communication I/F 24, the timer 25, and the error determination module 26 are configured to be integrated within one semiconductor integrated circuit as a one-chip microcomputer in this embodiment. However, those components are not limited to the configuration of the one-chip microcomputer.

The CPU 21 executes diverse programs stored in the flash memory 23 to realize the control of the respective parts of the vehicle. The CPU 21 has a general configuration having diverse registers and program counters not shown. The CPU 21 according to this embodiment allows the error determination module 26 to execute an error determination process at the time of startup immediately after reset, as described later. The CPU 21 jumps to an address of the flash memory 23 which is designated by the error determination module 26 to start processes based on the diverse programs in the flash memory 23.

Figure 2:
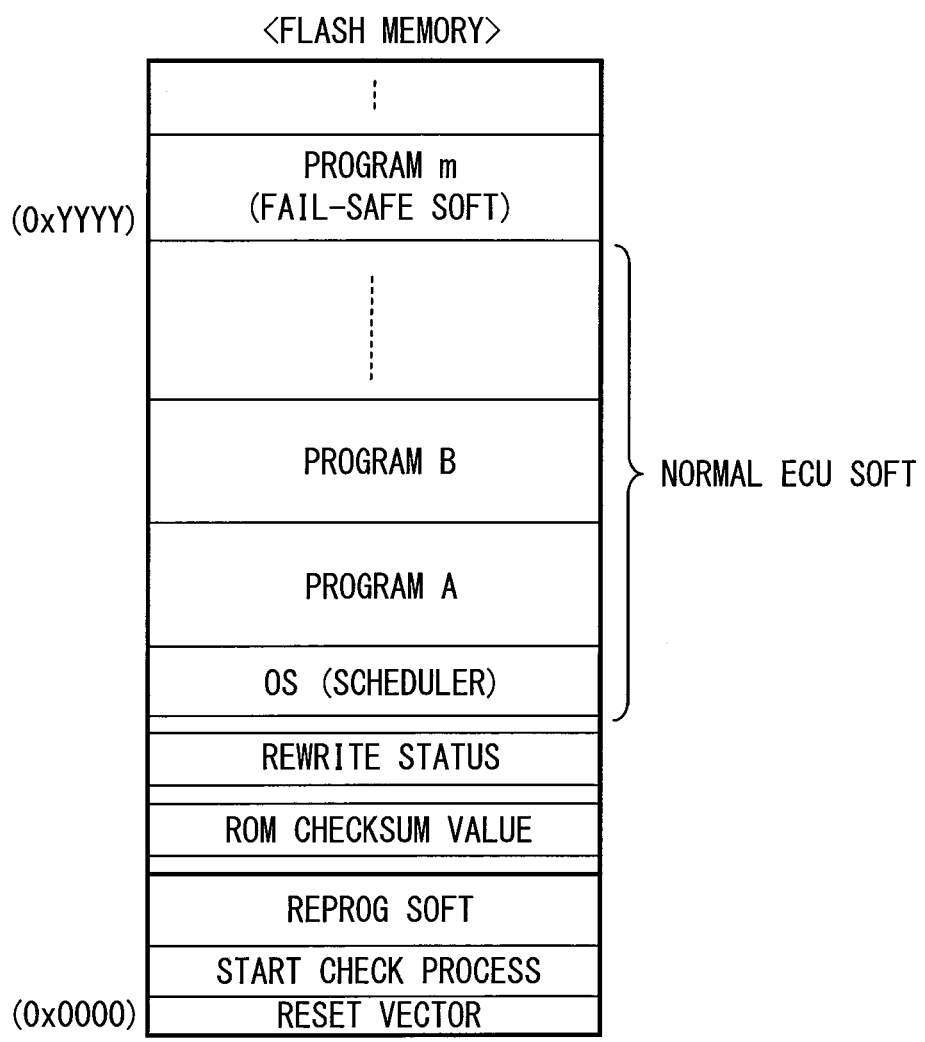
FIG. 2 is an illustrative view illustrating an arrangement of programs in a flash memory according to the first embodiment.

The flash memory 23 is a nonvolatile memory in which a storage content is electrically rewritable. As illustrated in FIG. 2, the diverse programs are stored in the flash memory 23. Specifically, the flash memory 23 stores a reset vector, a startup determination processing program, a reprogramming software, a ROM checksum value, a rewrite status, an OS (scheduler), a program A, a program B, . . . a program m (fail-safe software) therein.

The reset vector is a head address of the program at which the CPU starts execution and which is set in a memory in a general microcomputer. The memory address of the reset vector is 0x0000.

The startup determination processing program is a program configured to determine whether reprogramming executed previously is normally completed, or not, on the basis of the rewrite status. If reprogramming is normally completed, the startup determination processing program starts normal ECU software, and if reprogramming is not normally completed, the startup determination processing program starts the reprogramming software. The head address of the startup determination processing program is set in the reset vector.

The normal ECU software is a generic name of the respective programs that substantially control the vehicle, such as the OS and the respective programs A, B . . . . After transitioning to the normal ECU software, the OS first starts processing, performs an initializing process and ROM checksum, and thereafter schedules the respective programs A, B . . . while monitoring various input information to be input to the microcomputer.

The reprogramming software is a program for reprogramming the respective programs of the flash memory 23. Specifically, when the reprogramming software is executed, the reprogramming software acquires through the onboard network 20 an update version program of a program to be reprogrammed, and writes the update version program into the flash memory 23 to perform reprogramming. The update version program can be transmitted from the program rewriting tool 15 by connecting the program rewriting tool 15 to the connector 14. A more detailed function of the reprogramming software is disclosed in PTL 1 in detail. Reprogramming may be collectively performed for the overall flash memory 23, or may be performed on a program basis or a block basis.

When reprogramming starts, the reprogramming software sets the rewrite status as "during rewriting" (in fact, sets binary data indicative of "during rewriting"). After reprogramming has been normally completed, the reprogramming software sets the rewrite status as "rewrite completion". The rewrite status remains "during rewriting" so long as reprogramming is not normally completed after reprogramming has started.

The ROM checksum value is a check code (check code) in checking the memory by the checksum. The ROM checksum value according to this embodiment is a value set for the overall storage content in the flash memory 23. The ROM checksum value is updated to a value corresponding to the storage content after reprogramming, every time the reprogramming is performed.

The program m (corresponding to an example of an error handling processing program according to the present disclosure) is a fail-safe software to be executed when an error is determined through an error determination process, where the error determination process is executed by the error determination module 26 immediately after reset. When the error is determined by the error determination module 26 and the fail-safe software is executed, the normal ECU software is not executed but various fail-safe processes based on the fail-safe software is performed. A memory address of the fail-safe software is 0xYYYY.

(2) Schematic Configuration of Error Determination Module

Subsequently, with reference to FIG. 3, a description will be given of a configuration of the error determination module 26 that performs an error determination process immediately after resetting the CPU 21. The error determination module 26 is configured by hardware disposed independently of the CPU 21 and the flash memory 23.

Immediately after the CPU 21 is reset, an address (0xXXXX) of the error determination module 26 is first set in a program counter. On the basis of that address, the CPU 21 first operates the error determination module 26. Specifically, the CPU 21 according to this embodiment first sets the address of the error determination module 26 in the program counter after reset, and proceeds to processing in the error determination module 26, while a conventional CPU is generally configured so that, after reset, the memory address of the reset vector is first set in the program counter to jump to the reset vector.

The error determination module 26 includes an error determination startup register 31, an error frequency storage register 32, an error determination threshold register 33, a comparator 34, an error determination startup destination register 35, and a startup destination determination unit 36.

The error determination startup register 31 is a register in which a predetermined error determination startup flag is set by the CPU 21 immediately after the CPU 21 has been reset. When the error determination startup flag is set by the CPU 21, the error determination startup register 31 starts the comparator 34. For example, while the error determination startup flag is cleared, the error determination startup register 31 outputs "0" and stops the comparator 34. When the error determination startup flag is set, the error determination startup register 31 outputs "1" and starts the comparator 34.

The error frequency storage register 32 is a register in which the number of errors (corresponding to an example of the number of abnormalities in the present disclosure) is cumulatively stored (updated), every time the abnormality is determined in the ROM checksum. The ROM checksum is executed when the CPU 21 starts the normal ECU software, and periodically executed during the execution of the normal ECU software. The number of errors indicates the number of times by which the abnormality is determined by the CPU 21. An initial value of the number of errors in the error frequency storage register 32 is 0, and the number of errors is incremented by 1 through the CPU 21 every time the abnormality is determined by the ROM checksum. The error frequency storage register 32 can correspond to an example of abnormality frequency storage means and an abnormality frequency storage unit.

The error determination threshold register 33 is a register in which an error determination threshold (corresponding to an example of an abnormality determination threshold in the present disclosure) is stored. The error determination threshold is a determination reference value for determining whether an error occurs in the flash memory 23, or not, on the basis of the number of errors stored in the error frequency storage register 32. The error determination threshold can be appropriately determined, but may be preferably a value of 2 or more. In this embodiment, the error determination threshold is set to, for example, 10.

The comparator 34 compares the number of errors stored in the error frequency storage register 32 with the error determination threshold stored in the error determination threshold register 33, and outputs error determination data indicative of a comparison result thereof to the startup destination determination unit 36. Specifically, if the number of errors is smaller than the error determination threshold, the comparator 34 outputs "0" indicative of no error occurrence as the error determination data, and if the number of errors is equal to or larger than the error determination threshold, the comparator 34 outputs "1" indicative of error occurrence as the error determination data. The comparator 34 can correspond to an example of abnormality determination means and an abnormality determination unit.

The startup destination determination unit 36 sets a startup destination address of the CPU 21 in the flash memory 23 on the basis of the error determination data from the comparator 34, and outputs the startup destination address to the CPU 21. Specifically, when the error determination data is "0" (no error occurrence), the startup destination determination unit 36 sets the reset vector address (0x0000) as the startup destination, and outputs the startup destination address to the CPU 21. In detail, the startup destination determination unit 36 sets the startup destination address (0x0000) in the program counter within the CPU 21. When the error determination data is "1" (error occurrence), the startup destination determination unit 36 sets an error determination start destination address (in this example, 0xYYYY which is a head address of the fail-safe software) as the startup destination, and outputs the startup destination address to the CPU 21. The error determination startup destination address is stored in the error determination startup destination register 35 in advance. In detail, the startup destination determination unit 36 sets the startup destination address (0xYYYY) in the program counter within the CPU 21. The startup destination determination unit 36 can correspond to an example of abnormality handling means and an abnormality handling unit.

When the startup destination address is output by the startup destination determination unit 36, and set in the program counter of the CPU 21 as described above, the CPU 21 jumps to the address (reset vector or fail-safe software) set in the program counter, and starts the processing. The error frequency storage register 32, the error determination threshold register 33, and the error determination startup destination register 35 are different from a register not shown within the CPU 21, and maintains the storage content even if the microcomputer is reset.

(3) Operation of CPU

A basic flow of the operation of the CPU 21 will be described with reference to FIG. 4. After reset, the CPU 21 operates the error determination module 26 and waits for an error determination result as already described. Specifically, the CPU 21 determines whether the number of errors in the error frequency storage register 32 is equal to or larger than the error determination threshold in the error determination threshold register 33, or not, through the comparator 34 (S110).

If the number of errors is smaller than the error determination threshold, the startup destination determination unit 36 sets the address (0x0000) of the reset vector in the program counter of the CPU 21 (S120). If the number of errors is equal to or larger than the error determination threshold, the startup destination determination unit 36 sets the error determination startup destination address (in this example, 0xYYYY) stored in the error determination startup destination register 35 in the program counter of the CPU 21 (S130).

S110 to S130 are not a process to be executed directly by the CPU 21, but a process of the error determination module 26 which operates according to an instruction from the CPU 21. Broadly, S110 to S130 can be regarded as a process to be executed indirectly by the CPU 21. For that reason, the processes illustrated in FIG. 4 include the process of the CPU 21 and the process of the error determination module 26.

When the address of the reset vector is set in the program counter in S120, the CPU 21 jumps to the reset vector of the flash memory 23 in S140. When the error determination startup destination address is set in the program counter in S130, the CPU 21 jumps to the error determination startup destination address (that is, fail-safe software of the address 0xYYYY of the flash memory 23) in S150.

The processing of S110 to S150 are processing to be realized as hardware processing by the CPU 21 and error determination module 26 before the CPU 21 performs various processing on the basis of the program in the flash memory 23. Specifically, the CPU 21 performs the error determination and setting of a jump destination address through the hardware processing prior to performing software processing based on the program. After the CPU 21 has jumped to the jump destination address set by the hardware processing, the CPU 21 proceeds to the software processing from S160 or in S280.

In S160, the CPU 21 executes the program of the address set in the reset vector, that is, the startup determination process. The CPU 21 determines whether the rewrite status is determined as "rewrite completion" in the startup determination process, or not, in S170. If the rewrite status is not determined as "rewrite completion" (that is, when the rewrite status remains "during rewriting"), the CPU 21 proceeds to S260. The CPU 21 starts the reprogramming software, waits for connection of the program rewriting tool 15, and rewrites the existing program by the update version program if the program rewriting tool 15 is connected, in S260.

When the rewrite status is determined as "rewrite completion" in S170, the CPU 21 starts the initializing process by the OS to start the normal ECU software in S180, and executes the ROM checksum (corresponding to an example of the memory check in the present disclosure) as a function of the OS in S190. The CPU 21 determines whether the result of the ROM checksum in S190 is OK (normal), or not, in S200, and executes the normal ECU software as it is in S210 if the result is OK.

The CPU 21 periodically performs the ROM checksum as indicated in S220 to S240 even during the execution of the normal ECU software. Specifically, when an execution timing of the ROM checksum arrives, the CPU 21 executes the ROM checksum in S220, and determines whether the result of the ROM checksum in S220 is OK, or not, in S230. If it is determined that the result is OK in S230, the CPU 21 continuously executes (continues) the normal ECU software in S240. If the execution timing of the ROM checksum again arrives, the CPU 21 returns to S220, and executes the ROM checksum.

If it is determined that the result of the ROM checksum is determined to be abnormal in S200 or S230, the CPU 21 writes the number of errors in the error frequency storage register 32 within the error determination module 26 in S250. Specifically, the CPU 21 updates (increments by one) the number of errors currently stored. After the number of errors is written, the CPU 21 per se resets the CPU 21 (that is, resets the microcomputer). The CPU 21 that executes S250 can correspond to an example of an abnormality frequency update unit and abnormality frequency update means.

When the error determination startup destination address is set as the startup destination (S150), the CPU 21 performs a fail-safe process in S280. That is, the CPU 21 executes the fail-safe software stored in 0xYYYY which is the error determination startup destination address.

(4) Advantages of First Embodiment

According to the ECU 11 of this embodiment described above, every time the abnormality is determined by the ROM checksum (S250), the number of errors is updated before the CPU 21 is reset. If the number of errors is equal to or larger than the error determination threshold after reset, fail-safe processing software is executed (S280). Independent of a flow of the normal process starting with a jump to the reset vector, the fail-safe processing software is executed. During the execution of the fail-safe processing software, the ROM checksum is not performed. That is, the microcomputer reset caused by the abnormality of the ROM checksum is not repetitively persistently performed. For that reason, even if abnormality occurs in the storage content of the flash memory 23, appropriate processing (in this embodiment, fail-safe process) can be performed while suppressing wasteful consumption of the electric power.

The execution of the fail-safe processing software at the time of the error determination is exemplary, and what specific processing is to be executed at the time of the error determination can be appropriately determined. For example, the reprogramming software may start and reprogramming may be waited for. For example, the failure occurrence may be notified the user (driver of the vehicle) of by some method in addition to the execution of a predetermined fail-safe process.

In this embodiment, even if the abnormality is determined by the ROM checksum, the control does not immediately proceeds to the fail-safe process by only one abnormality determination. Rather, if the number of times (the number of errors) by which the abnormality is determined becomes equal to or larger than the error determination threshold, the control proceeds to the fail-safe process. For that reason, precision in the error determination can be enhanced. Moreover, the storage and update of the number of errors are not performed by the RAM 22 or the flash memory 23, but is performed with the use of the error frequency storage register 32 disposed separately from those components. For that reason, the number of errors can be surely stored regardless of the states of the RAM 22 and the flash memory 23. As a result, the precision in the error determination can be further enhanced.

In this embodiment, the error determination immediately after the CPU 21 is reset is realized by not software processing but the hardware processing using the error determination module 26. For that reason, the error determination can be performed rapidly and with high reliability. If the error determination is to be realized by the software processing, there is a risk that the storage area of the flash memory 23 is required as much, and the costs increase. However, such problems can be suppressed by realizing the error determination through the hardware processing as in this embodiment.

(Second Embodiment)

An ECU in a second embodiment will be described. A difference from the ECU 11 in the first embodiment illustrated in FIG. 1 will be focused on. A main difference between the ECU (not shown) of this embodiment and the ECU 11 in the first embodiment resides in the storage content of the flash memory and the configuration of the error determination module.

Figure 5:
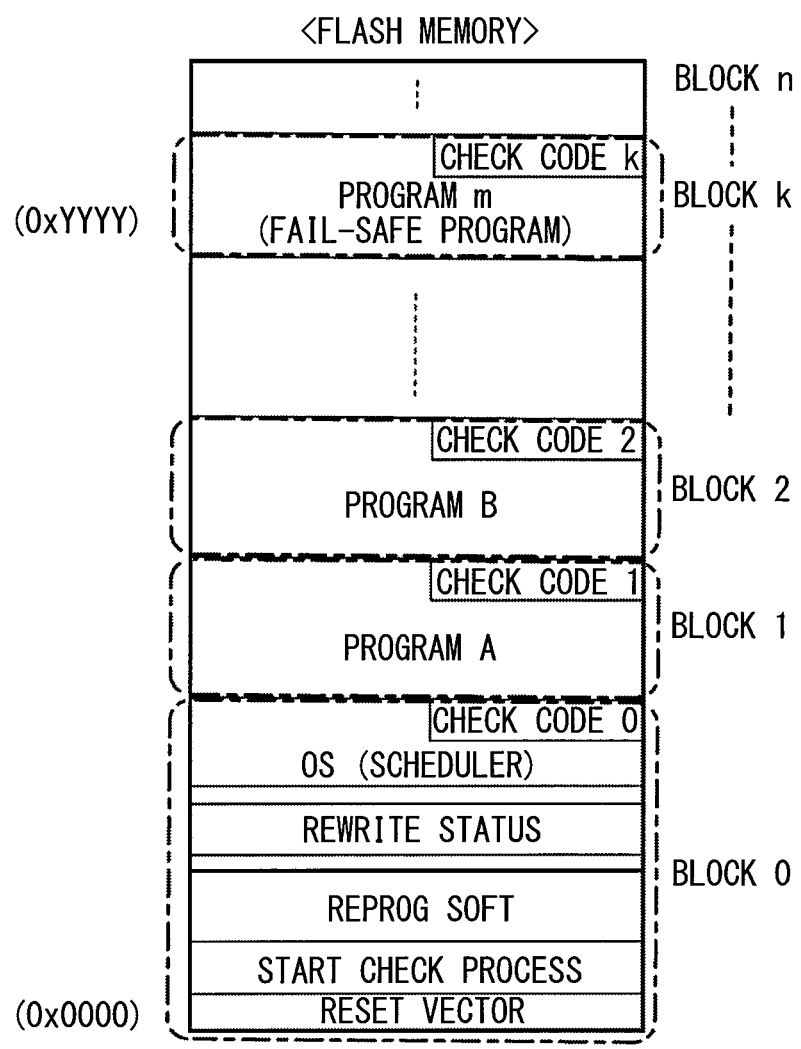
FIG. 5 is an illustrative view illustrating an arrangement of programs in a flash memory according to a second embodiment.

In the flash memory of this embodiment, as illustrated in FIG. 5, a storage area is divided into multiple blocks, and a check code (that is, ROM checksum value) for the ROM checksum is set for each of the blocks. A specific manner of dividing the flash memory 23 into blocks can be appropriately determined.

Figure 3:
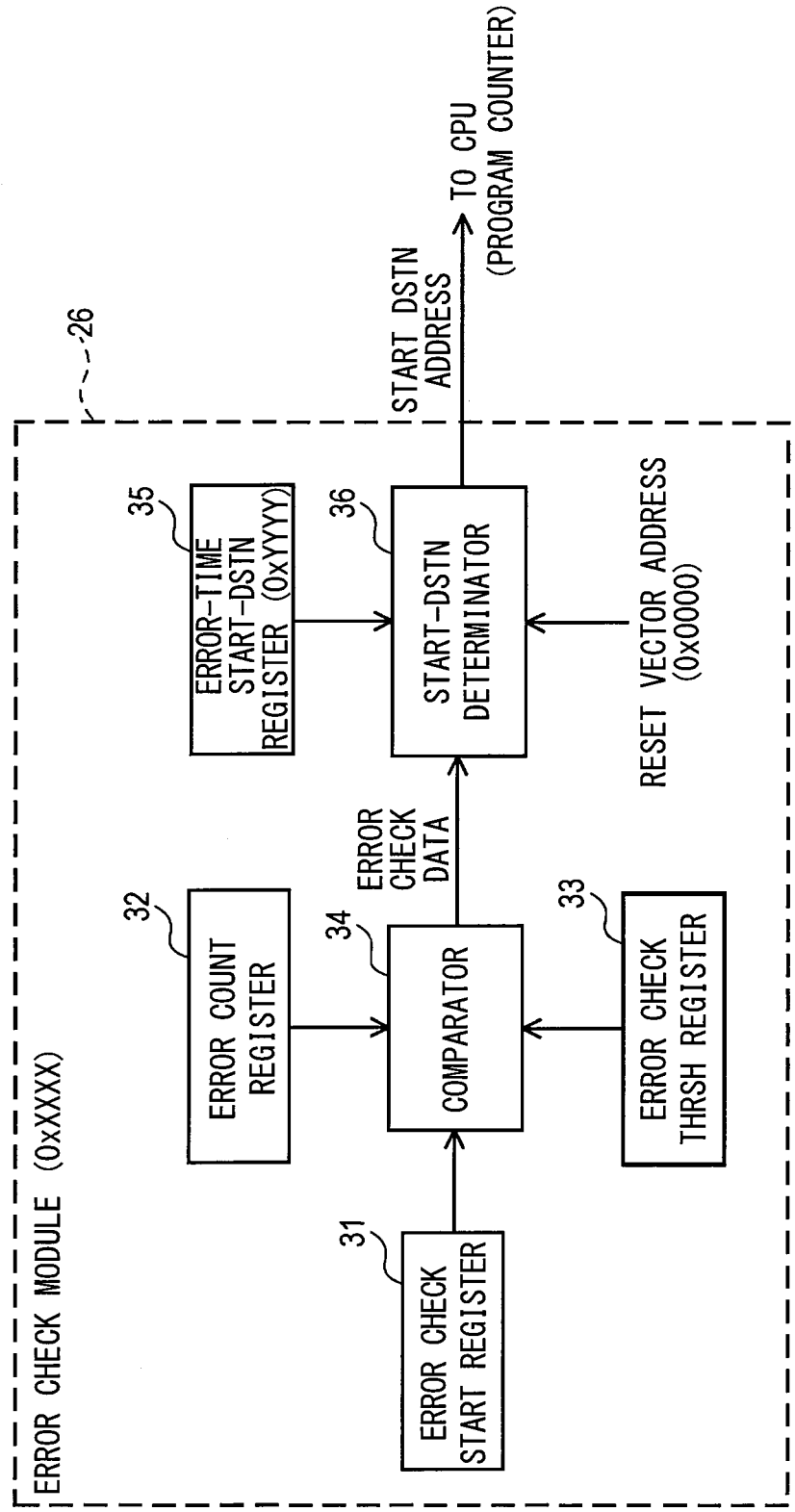
FIG. 3 is a block diagram illustrating a schematic configuration of an error determination module according to the first embodiment.
Figure 6:
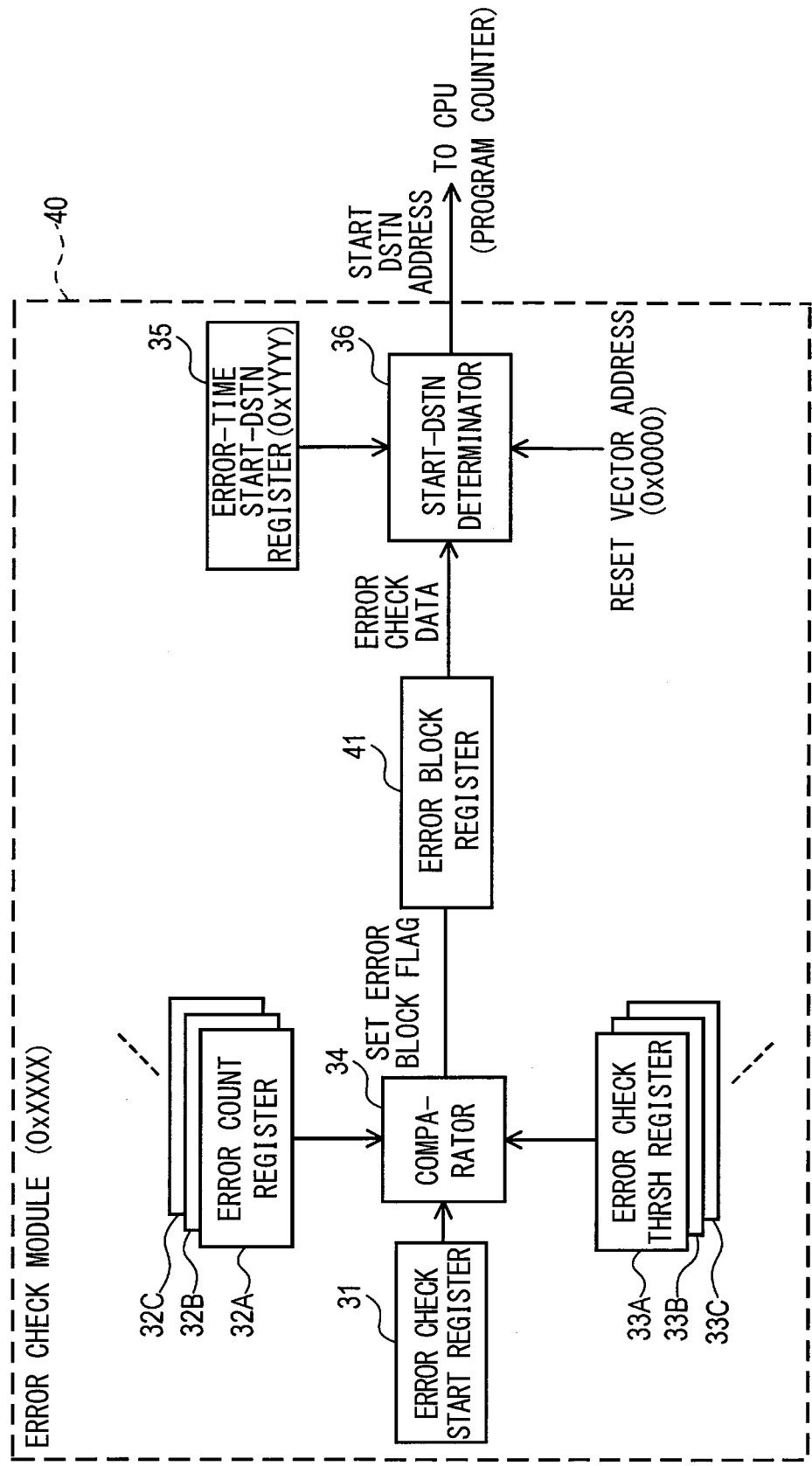
FIG. 6 is a block diagram illustrating a schematic configuration of an error determination module according to the second embodiment.

An error determination module 40 according to this embodiment is configured as illustrated in FIG. 6, and different in the configurations of the error frequency storage register 32 and the error determination threshold register 33 as is apparent in comparison with the error determination module 26 of the first embodiment illustrated in FIG. 3. In this embodiment, an error occurrence block register 41 is newly disposed between the comparator 34 and the startup destination determination unit 36.

The error frequency storage register 32 in this embodiment is disposed for each block of the flash memory, individually. Specifically, the multiple error frequency storage registers for the respective blocks such as an error frequency storage register 32A corresponding to a block 0, an error frequency storage register 32B corresponding to a block 1, an error frequency storage register 32C corresponding to a block 2, . . . are disposed.

Exactly like the above, the error determination threshold register 33 is disposed for each block of the flash memory, individually. Specifically, the multiple error determination threshold registers for the respective blocks such as an error determination threshold register 33A corresponding to the block 0, an error determination threshold register 33B corresponding to the block 1, an error determination threshold register 33C corresponding to the block 2, . . . are disposed.

The comparison of the number of errors with the error determination threshold by the comparator 34 is also performed for each of the blocks, individually. For example, in the block 0, the number of errors stored in the error frequency storage register 32A corresponding to the block 0 is compared with the error determination threshold stored in the error determination threshold register 33A corresponding to the block 0.

The comparator 34 performs the above comparison for the respective blocks 0 to n, individually. If there is a block in which an error occurs (that is, block in which the number of errors is equal to or larger than the error determination threshold), the comparator 34 sets a flag of the error occurrence block in the error occurrence block register 41.

The error occurrence block register 41 is configured so that the flag indicative of whether an error occurs, or not, is set for each of the blocks. When it is determined by the comparator 34 that an error occurs in a certain block, a flag of the subject block in the error occurrence block register 41 is set by the comparator 34. Accordingly, referring to the error occurrence block register 41, it is possible to know which block is normal, and an error occurs in which block.

The error occurrence block register 41 outputs "0" indicative of no error occurrence as error determination data to the startup destination determination unit 36 while all of the blocks are normal. However, when the flag is set in any one of the blocks (that is, when it is determined that an error occurs in any one of the respective blocks), the error occurrence block register 41 outputs "1" indicative of the error occurrence as the error determination data to the startup destination determination unit 36.

Figure 7:
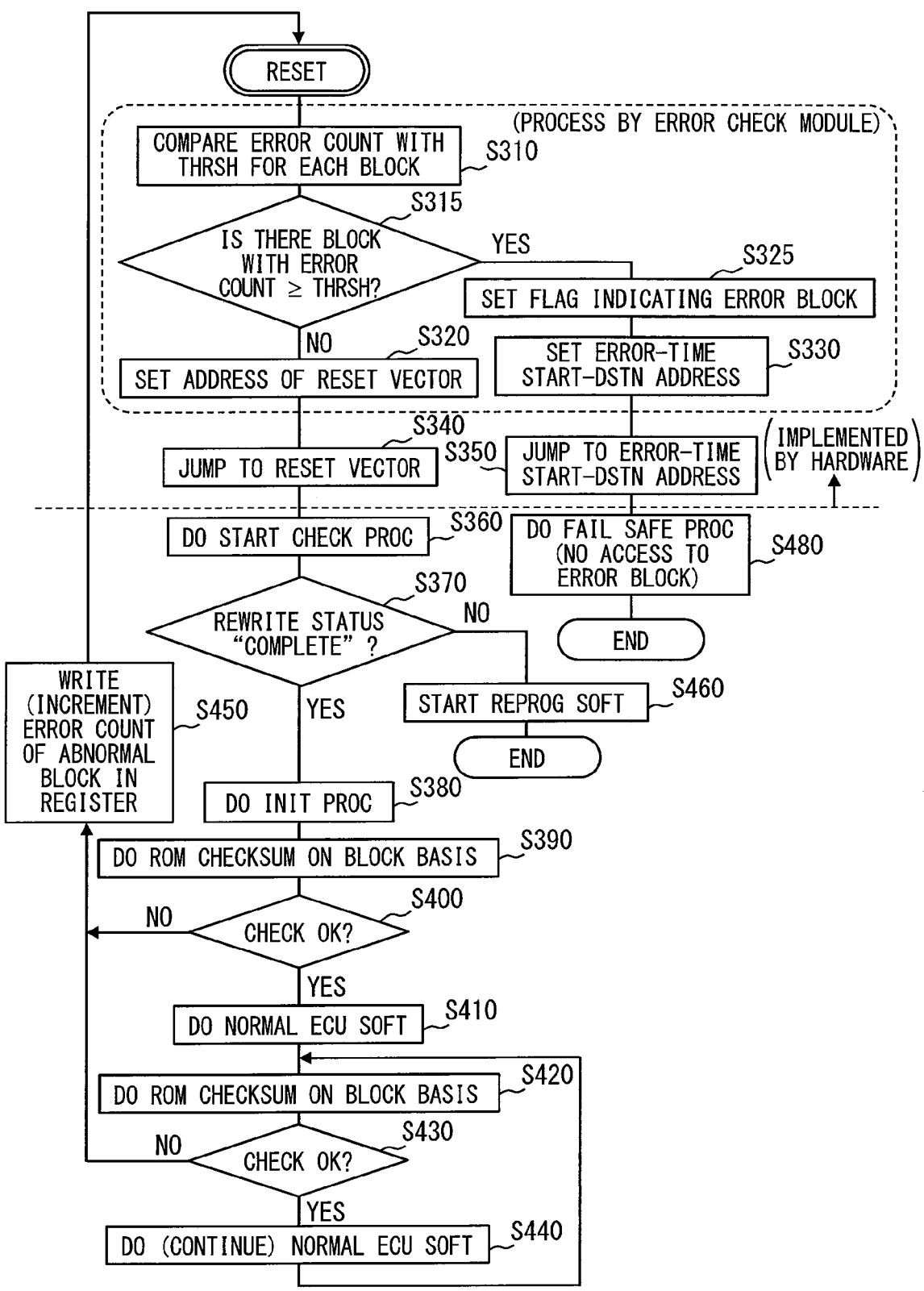
FIG. 7 is a flowchart illustrating the operation of a CPU according to the second embodiment.

Operations of the CPU in the above-configured ECU of this embodiment will be described in brief with reference to FIG. 7. The CPU in this embodiment operates the error determination module 40 after reset, and waits for the error determination result. Specifically, on a block-by-block basis, the number of errors is compared with the error determination threshold by the comparator 34 (S310). As a result of the comparison, if there is no block in which the number of errors is equal to or larger than the error determination threshold, the control proceeds to S320. If there is any one block in which the number of errors is equal to or larger than the error determination threshold, the control proceeds to S325.

In S325, the flag indicative of the error occurrence block is set in the error occurrence block register 41. The processing in S330 and S350 is identical with the processing in S130 and S150 in FIG. 4, respectively. A fail-safe process in S480 is slightly different from the fail-safe process in S280 in FIG. 4. Specifically, in the fail-safe process (S480) according to this embodiment, programs in one or multiple other blocks is accessed (referred) to execute the fail-safe process. In this regard, a set value of the error occurrence block register 41 is read but the program in the error occurrence block is not accessed.

Figure 4:
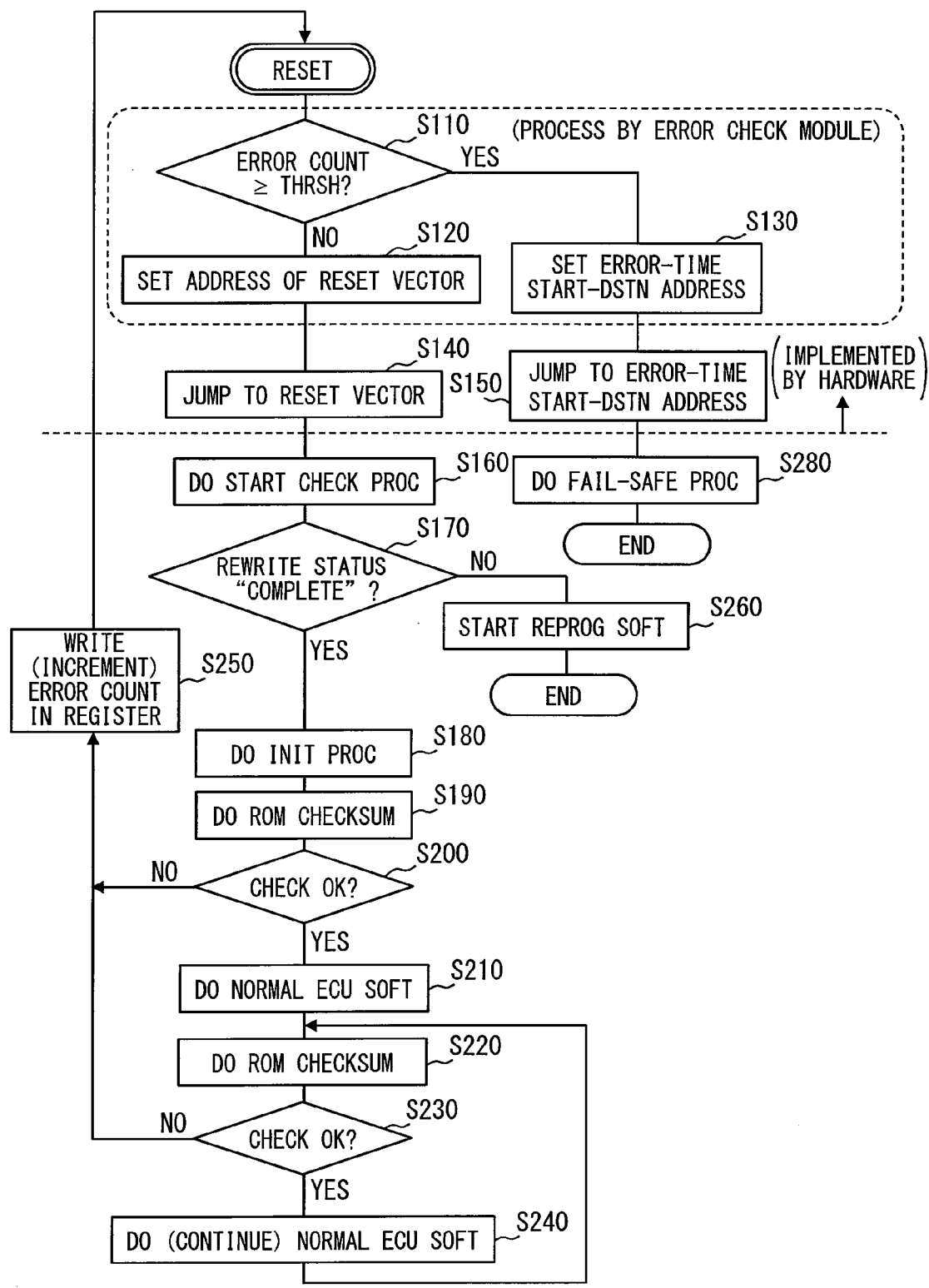
FIG. 4 is a flowchart illustrating the operation of a CPU according to the first embodiment.

The respective processing in S320 to S380, S400, S410, S430, S440, and S460 is identical with the respective processing in S120 to S180, S200, S210, S230, S240, and S260 in FIG. 4.

The ROM checksum in S390 and S420 is different from that in the first embodiment in that the ROM checksum is executed for each of the blocks, individually. The error frequency write (increment) into the error frequency storage register 32 in S450 is also different from that in the first embodiment in that the number of errors corresponding to the block determined to be abnormal in the ROM checksum is incremented for each of the blocks. The CPU 21 that executes S450 can correspond to an example of abnormality frequency update means and the abnormality frequency update means.

According to the above-configured ECU of this embodiment, the error determination is performed for each of the blocks, and if there is any one block determined as an error, the control proceeds to the fail-safe process. Therefore, precision in the error determination can be further enhanced, and appropriate handling (fail-safe process) of the error occurrence can be performed more quickly. Because the blocks in which an error occurs are distinguishable from the blocks in which no error occurs, the blocks that cannot be accessed in the fail-safe process can be minimized, and a reduction in the function of the fail-safe process can be suppressed.

(Modification)

Embodiments of the present disclosure have been described above. However, the embodiments of the present disclosure are not limited to the above-described embodiments and can have various modifications.

For example, in the above embodiments, the error determination immediately after reset is realized by the hardware processing using the error determination module (refer to FIGS. 3 and 6). Alternatively, the function of the error determination module may be realized by software processing. Taking a processing speed and the costs into account, the configuration in which the error determination module is realized by the hardware processing as described above may be preferable.

In the above embodiments, as a method of checking the storage content in the flash memory 23, the ROM checksum is used. This method is exemplary, and the memory check may be performed by using various other methods (for example, CRC).

In the above second embodiment, the number of errors is compared with the error determination threshold for all of the blocks in the comparator 34. Alternatively, when the error determination (the number of errors error determination threshold) is made in any one or a predetermined number of (multiple) blocks (corresponding to an example of the number of error handling reference blocks in the present disclosure), the comparison may stop at that time, and the flag of the error occurrence block register 41 may be set for those error determined blocks.

In the ROM checksum in S390 and S420, the control proceeds to S450 after the ROM checksum has been performed for all of the blocks. Alternatively, if, in the course of sequentially executing the ROM checksum for the blocks, the number of blocks determined as having abnormality by the ROM checksum reaches a predetermined number which may be one or plural (corresponding to an example of a reset reference block number in the present disclosure), the ROM checksum may stop at that time, and the control may proceed to S450.

The embodiments and the configurations according to the present disclosure have been exemplified, but the embodiments and the configurations according to the present disclosure are not limited to the respective embodiments and the respective configurations described above. The embodiments and the configurations obtained by appropriately combining the respective technical elements disclosed in the different embodiments and configurations together also fall within the scope of the embodiments and the configurations according to the present disclosure.

The invention claimed is:

1. An onboard electronic control unit comprising:
a nonvolatile memory that stores a plurality of programs including an operating system (OS) and a control program for controlling a vehicle;
a CPU that executes the plurality of programs and periodically performs memory check of whether or not a storage content in the memory is normal, and that executes a reset of the CPU itself when it is determined by the memory check that the storage content in the memory is abnormal;
an abnormality frequency storage unit that stores the number of abnormalities defined as the number of times it is determined by the memory check that the storage content in the memory is abnormal;
an abnormality frequency update unit that, every time it is determined by the memory check that the storage content in the memory is abnormal, updates the number of abnormalities stored in the abnormality frequency storage unit before the reset of the CPU is executed;
an abnormality determination unit that determines whether or not the number of abnormalities stored in the abnormality frequency storage unit is equal to or larger than a predetermined abnormality determination threshold, before the memory check is performed for the first time since the reset of the CPU; and
an abnormality handling unit that allows the CPU to execute a specific error handling processing program among the plurality of programs when the abnormality determination unit determines that the number of abnormalities is equal to or larger than the abnormality determination threshold, wherein during executing the error handling processing program, the CPU is prohibited from executing the memory check or from executing the reset of the CPU based on the memory check, and wherein:

the abnormality frequency storage unit, the abnormality determination unit, and the abnormality handling unit are hardware other than the memory and the CPU;

an address of the error handling processing program in the memory is set by the abnormality handling unit and stored in a program counter provided in the CPU and allows the CPU to execute the error handling processing program;

upon the reset of the CPU following the memory check, the abnormality determination unit determines, without the CPU starting the operating system and the control program for controlling the vehicle, whether or not the number of abnormalities is equal to or larger than the predetermined abnormality determination threshold; and upon determining by the abnormality determination unit that the number of abnormalities is equal to or larger than the abnormality determination threshold, the abnormality handling unit sets the address of the error handling processing program in the program counter of the CPU and causes the CPU to execute the specific error handling processing program without the CPU starting the operating system and the control program for controlling the vehicle.

2. The onboard electronic control unit according to claim 1, wherein the CPU executes the memory check on a predetermined block-by-block basis, and is reset when the number of blocks determined as having the abnormal storage content reaches a predetermined reset reference block number, which is one or more, and the abnormality frequency storage unit stores the number of abnormalities on the block-by-block basis, and the abnormality frequency update unit updates the number of abnormalities on the block-by-block basis, the abnormality determination unit determines on the block-by-block basis whether or not the number of abnormalities is equal to or larger than the abnormality determination threshold, and the abnormality handling unit allows the CPU to execute the error handling processing program when the number of blocks determined as having the abnormal storage content by the abnormality determination unit reaches the predetermined reset reference block number, which is one or more.

3. The onboard electronic control unit according to claim 2, wherein the error handling processing program is configured to refer to a reference target block, which is at least one block except for a block storing the error handling processing program, and when the abnormality determination unit determines that the number of abnormalities in the reference target block is equal to or larger than the abnormality determination threshold, the error handling processing program is prohibited from referring to the reference target block.

4. The onboard electronic control unit according to claim 1, wherein:

upon determining by the abnormality determination unit that the number of abnormalities is less than the abnormality determination threshold, the abnormality handling unit sets an address of a startup determination processing program in the program counter of the CPU so that the CPU executes the startup determination processing program before the CPU starts the operating system and the control program for controlling the vehicle; and the startup determination processing program is configured to determine whether reprogramming executed previously is normally completed, or not.

5. The onboard electronic control unit according to claim 3, wherein:

in response to the abnormality determination unit determining that the number of abnormalities is less than the abnormality determination threshold, the abnormality handling unit sets an address of a startup determination processing program in the program counter of the CPU so that the CPU executes the startup determination processing program before the CPU starts the operating system and the control program for controlling the vehicle; and the startup determination processing program being configured to determine whether a previously executed reprogramming was normally completed.

\* \* \* \* \*